United States Patent
Martin et al.

[15] 3,692,911
[45] Sept. 19, 1972

[54] METHOD FOR SELECTIVELY COMBATING FUNGI AND WEEDS

[72] Inventors: Henry Martin, Basel; Hans Aebi, Riechen; Ludwig Ebner, Stein/AG, all of Switzerland

[73] Assignee: Ciba-Geigy AG

[22] Filed: June 22, 1970

[21] Appl. No.: 48,955

Related U.S. Application Data

[63] Continuation of Ser. No. 766,308, Oct. 9, 1968, abandoned, which is a continuation-in-part of Ser. No. 592,747, Nov. 8, 1966, which is a continuation-in-part of Ser. Nos. 433,154, Feb. 16, 1965, abandoned, Ser. No. 433,152, Feb. 16, 1965, abandoned, Ser. No. 433,183, Feb. 16, 1965, abandoned, Ser. No. 433,204, Feb. 16, 1965, abandoned, Ser. No. 433,203, Feb. 16, 1965, abandoned, Ser. No. 433,192, Feb. 16, 1965, abandoned, Ser. No. 433,198, Feb. 16, 1965, abandoned, Ser. No. 433,153, Feb. 16, 1965, abandoned, each is a continuation-in-part of Ser. No. 191,442, May 1, 1962, Pat. No. 3,288,851.

[30] Foreign Application Priority Data

May 6, 1961 Switzerland..............5336/61

[52] U.S. Cl...................................424/322, 71/120

[51] Int. Cl...............................................A01n 9/20
[58] Field of Search.....................................71/120

[56] References Cited

UNITED STATES PATENTS 3,079,244  2/1963  Scherer et al.................71/120
3,165,549  1/1965  Martin et al..................71/120

FOREIGN PATENTS OR APPLICATIONS 1,062,059  7/1959  Germany......................71/120

*Primary Examiner*—James O. Thomas, Jr.
*Attorney*—Harry Goldsmith, Joseph G. Kolodny, Bryant W. Brennan and Edward J. Sites

[57] ABSTRACT

A method is provided for selectively and simultaneously controlling undesirable plant life in crop area wherein a culture of rice, potatoes, corn, beans, peas, soyabeans, cotton, peanuts, carrots or tomatoes are growing. According to the method of this invention an effective amount of the compound of the formula

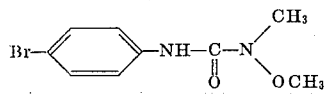

is applied to the crop area.

1 Claim, No Drawings

METHOD FOR SELECTIVELY COMBATING FUNGI AND WEEDS

CROSS REFERENCE TO RELATED APPLICATIONS

This application is a continuation of application Ser. No. 766,308 filed Oct. 9, 1968, now abandoned, which is a continuation in part of application Ser. No. 592,747 filed Nov. 8, 1966 which is in turn a continuation in part of applications Ser. Nos. 433,154; 433,152; 433,183; 433,204; 433,203; 433,192; 433,198; 433,153, filed Feb. 16, 1965, now abandoned which are in turn each a continuation in part of application Ser. No. 191,442 filed May 1, 1962, now U.S. Pat. No. 3,288,851.

BACKGROUND OF INVENTION

This application relates to a novel method of selectively controlling undesirable plant life especially both fungi and weeds in cultures of commercially valuable crops such as rice, potatoes, corn, beans, peas, soyabeans, cotton, peanuts, carrots and tomatoes.

As is well known to those skilled in the art the yield obtained in an area planted with the above noted crops is dependent to a large extend on controlling weeds and fungi in the crop area. Certain compounds can be employed which are herbicidally active. to control the weeds. The compounds employed as herbicides in a crop area must selectively control the growth of the weed but must not substantially affect the growth of the desired group. To control fungi it was suggested to use certain fungicidally active compounds. These compounds also have to be selective so as not to affect the desired crop. The requirement of employing both a herbicide and fungicide was not completely satisfactory. It required the purchase and application of two different products. Furthermore each product had to be separately evaluated to determine its affect on the desired crop.

Various compounds of the prior art were suggested for use as total or selective herbicides. Typical of the compounds suggested for the use are the urea derivatives such as those disclosed in U.S. Pat. No. 2,960,534 which discloses the herbicidal compound of the formula

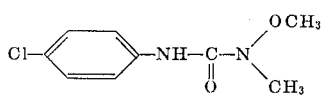

The above compound was indicated to have some selectivity with regard to herbicidal activity but it was not completely satisfactory because it did not exhibit any fungicidal activity. Accordingly when the above noted prior art compound was employed in a crop area it had to be employed together with another compound having fungicidal activity in order to control both weeds and fungi.

It is an object of the invention to provide a method for simultaneously and selectively controlling both fungi and weeds in an area wherein a commercial valuable crop is grown.

It is a further object of this invention to provide a method for simultaneously and selectively controlling both fungi and weeds in an area wherein certain commercially valuable crops are grown in which only one active compound need be employed.

SUMMARY OF THE INVENTION

A method is provided for pre-emergently or post-emergently selectively controlling fungi and weeds in an area where commercially valuable crops are grown in which a fungicidal weed killing amount of the compound of the formula

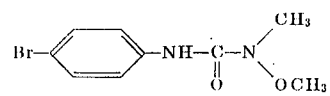

is applied to the area in which the crop is planted.

DETAILED DESCRIPTION OF THE INVENTION

The present invention is based on the observation that the compound of the formula

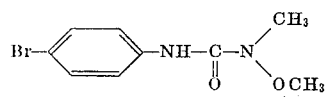

is very useful in selectively combating both fungi and weeds in a culture of potatoes, rice, corn, beans, soyabeans, peas, cotton peanuts, tomatoes or carrots.

Preparations are also provided for selectively combating weeds and fungi in a culture of said plants, which contain as an active ingredient the compound of formula (I) and an inert carrier or a solvent, a diluent, an emulsifier, a dispersing agent, a wetting agent, an adhesive agent, a fertilizer, a bactericide, a nematocide, an insecticide or another selective herbicide or fungicide.

For preparing solutions containing the compound of the formula (I) which are suitable for spraying as such there may be used, for example, organic solvents boiling above 100° C, e.g. mineral oil fractions boiling above 100° C, such as diesel oil or kerosene, or coal tar oils or oils of vegetable or animal origin, or hydrocarbons, such as alkylated naphthalenes, tetrahydronaphthalene, if desired, with the use of xylene mixtures, cyclohexanols, ketones, or chlorinated hydrocarbons, such as tetrachlorethane, trichlorethylene or tri- or tetra-chlorobenzenes.

As preparations that can be diluted with water to yield aqueous liquors for application as such there may be mentioned emulsion concentrates, pastes or wettable powders. As emulsifying or dispersing agent there are used nonionic products, such as condensation products of aliphatic alcohols, amines or carboxylic acids containing a hydrocarbon radical having 10 to 30 carbon atoms with ethylene oxide, such as condensation product of octadecyl alcohol with 25 to 30 mols of ethylene oxide or of soya bean oil fatty acid with 30 mols of ethylene oxide or of commercial oleylamine with 15 mols of ethylene oxide or of dodecyl mercaptan with 12 mols of ethylene oxide. As anionic emulsifying agents there may be mentioned the sodium salt of dodecyl alcohol sulfuric acid ester, the sodium salt of dodecyl-benzene sulfonic acid, the potassium or triethanolamine salt of oleic acid or of abietic acid or of a mixture of these acids, or the sodium salt of a petroleum sulfonic acid. As cationic dispersing agents there may be used quaternary ammonium compounds, such as cetyl-pyridinium bromide or dihydroxy-ethyl-benzyl-dodecyl-ammonium chloride.

A solid carriers for making dusting or strewing powders there may be used talcum, kaolin, bentonite, calcium carbonate or calcium phosphate, or carbon cork meal or wood meal or other materials of vegetable origin. It is very advantageous to make up the preparations in a granulated form. The preparations in their various forms may also have incorporated therewith in the usual manner substances that improve their dispersibility, adhesion, resistance to rain or penetrating power, such as fatty acids, resins, glue, casein or, for example, alginates.

The following Examples illustrate the invention, the parts being by weight.

EXAMPLE 1

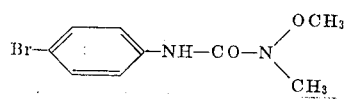

27 grams of N-phenyl-N'-methoxy-N'-methyl-urea are dissolved in 100 cc of glacial acetic acid, 12.3 grams of anhydrous sodium acetate are added, and the bromination is carried out at 70° C with 26.3 grams $Br_2$ dissolved in glacial acetic acid.

The yield of crude N-4-bromophenyl-N'-methyl-N'-methoxy-urea is 34 grams. The crude product melts at 91° to 94° C, and, when recrystallized from cyclohexane, the product melts at 95° to 96° C. N-4-bromophenyl-N'-methyl-N'-methoxy-urea obtained by a known method from para-bromo-phenyl isocyanate and O:N-dimethyl-hydroxyl-amine melts at 95.5° to 96° C. A mixture of the latter with the compound prepared as described above melts at 94.5° to 95.5° C.
Analysis: $C_9H_{11} O_2 N_2 Br$
Calculated: C 41.72% H 4.28% Br 30.84%
Found: C 41.89% H 4.43% Br 30.61%

EXAMPLE 2 a. To 10 parts of the compound of the above formula (I) are added 2 parts of sulfite cellulose waste liquor and 100 cc of water, and the mixture is then subjected to intense grinding, to yield a stable dispersion of fine particle size which may be diluted as required with water.

b. to 50 parts of the compound of the formula (I) are added 40 parts of kaolin (Bolus alba), 3.5 parts of a condensation product of 1 mol of para-tertiary octylphenol with 8 mols of ethylene oxide, 1.5 parts of heptadecenyl-benzimidazole sulfonate and 5 parts of finely divided $SiO_2$; the mixture is then subjected to intense grinding, to yield a stable dispersion of fine particle size which may be diluted as required with water.

EXAMPLE 3 a. An aqueous dilution of the dispersion according to Example 2(b) was applied as a spray to a field planted with Irish potatoes (variety : "Red Pontiac") at the rates of 1.5 and 3 pounds of active substance per acre, 2 days after the planting of the potatoes. The following weeds were present in the test field:

| Common Name | Scientific Name |
| --- | --- |
| Goosegrass | Eleusine indica |
| Crabgrass | Digitaria sanguinalis |
| Pangolagrass | Digitaria decumbens |
| Bermudagrass | Cynodon dactylon |
| Bahiagrass | Paspalum notatum |
| Pokeweed | Phytolacca americana. |

At the weed evaluation 2 months after the treatment, all the weeds present in the test field were completely or almost completely killed. There was no phytotoxicity observed on the potatoes treated. At the yield evaluation 3 months after the planting date there was observed that the test field treated according to the invention yielded over one-third more potatoes than an untreated control field. Good selective herbicidal effects were also obtained according to the method described in this Example with an application rate of 0.5 pound of active substance per acre.

b. In another test a culture of white potatoes was treated in the manner set forth above under (a), the application rates being 1.0 and 3.0 pounds of active substance per acre. There was observed at the weed evaluation 2 months after the treatment that the following weeds which had been predominant in the treated field were practically completely killed:
Crabgrass, Ragweed (Ambrosia trifida), and Smartweed (Polygonum).

No phytotoxicity was observed on the potatoes treated.

c. In a further test an aqueous dilution of the dispersion according to Example 2 was applied as a spray to a field planted with white potatoes, at the rate of 1.0 pound of active substance per acre, 4 weeks after the planting of the potatoes. There was observed at the weed evaluation 1 month after the treatment that the following weeds which had been predominant in the treated field were practically completely killed:
Foxtail, Ragweed and Smartweed.

No phytotoxicity was observed on the potatoes treated, even if the application rate was raised up to 8 pounds of active substance per acre.

d. Potatoes were planted in rows. Three days afterwards, the field was sprayed with a spraying liquor according to Example 2 (a), using 1.0, 2.0 or 3.0 pounds of active substance per acre, respectively.

Results were evaluated 57 days after the treatment. The potatoes had developed quite normally, whereas the weeds that had grown up to the treatment date were killed practically completely, as is evident from the following Table

| Weeds | Quantity of active substance in lbs/acre | | |
| --- | --- | --- | --- |
| | 1.00 effect | 2.00 effect | 3.00 effect |
| Stellaria media (chickweed) | 10 | 10 | 10 |
| Polygonum persicaria (Smartweed) | 7 | 10 | 10 |
| Capsella bursa past (Shepherd's purse) | 10 | 10 | 10 |
| Veronica persicaria (Buxbaum's speed well) | 10 | 10 | 10 |
| Lamium purp. (Red dead nettle) | 10 | 10 | 10 |

| | | | |
|---|---|---|---|
| Sonchus arvensis (corn sowthistle) | 10 | 10 | 10 |
| Chenopodium album (Lambsquater 7 | 10 | 10 | 10 |

Ratings:
10 means full effect; plant absolutely dead.
0 means plant quite normal.

EXAMPLE 4

Aqueous dilutions of the dispersion according to Example 2 (b) were applied as sprays at rates decreasing from 8 to 0.25 pounds of active substance per acre to cultures of rice plants (paddy rice) in the following manner:
1. Pre-plant soil incorporation. (Harrowed into the soil two days before the rice was sown)
2. Preemergent application. (Spraying of the field 1 day after the sowing of the rice)

Evaluation:
In the case of (1) : 7 weeks after the treatment
In the case of (2) : 7 weeks after the treatment Results:
At the time of the evaluation an untreated control field was heavily infested with junglerice (Panicum) as the only weed present. In the case of the test fields treated according to the methods (1.) and (2.) set forth above, it was observed that at the rate of 0.5 pound per acre of active substance the rice cultures were completely freed from the junglerice and that the rice tolerated 8.0 pounds per acre of active substance without being damaged.

EXAMPLE 5 a. An aqueous dilution of the dispersion according to Example 2(b) was applied as a spray to a field sown with corn at a rate of 0.5 pounds of active substance per acre, 2 days after the sowing of the corn.

At the weed evaluation, 4 weeks after the treatment, it was observed that the following weeds which have been predominant in the treated field, were completely killed: Lovegrass, Crabgrass and Pigweed. There was no phytotoxicity observed on the treated corn.

b. Aqueous dilutions of the dispersion according to Example 2 (b) were applied as sprays at rates decreasing from 8 to 2.0 pounds of active substance per acre to cultures of corn in the following manner:
1. pre-plant soil incorporation (Harrowed into the soil two days before the corn was sown).
2. pre-emergent application (spraying of the field 1 days after the sowing of the corn).

Evaluation in both cases:
4 weeks after the treatment.

Results:
At the time of the evaluation an untreated control field was heavily infested with junglerice (Panicum) as the only weed present. In the case of the test fields treated according to the methods (1) and (2) set forth above, it was observed that at rates of 2.0 pounds per acre of active substance the corn cultures were completely freed from the junglerice and that the corn tolerated 8.0 pounds per acre of active substance without being damaged.

c. A field was sown with corn and treated 1 day thereafter with an aqueous dilution of the dispersion set forth in Example 2(a) at a rate of 2.0 pounds of active substance per acre.

Examination four weeks after the treatment revealed that the following weeds were killed completely: Senecio vulgaris (Birdweed), Chenopodium album (Lambsquater), Sonchus ole raceus (Perenniol sowthistle), Lamium purpureum (Red dead nettle), Sinapis arvensis (Wild mustard), Matricaria chamomilla (chamopulle), Stellaria media (chickweed). The corn plants suffered no harm from this treatment.

EXAMPLE 6 a. An aqueous dilution of the dispersion according to Example 2(b) was applied as a spray to two test fields sown with Lima beans and Soybeans, respectively at a rate of 0.5 pounds of active substance per acre, 2 days after the sowing of said plants.

At the weed evaluation, 4 weeks after the treatment, it was observed that the following weeds which had been predominant in the treated fields, were completely killed: Lovegrass, Crabgrass and Pigweed. There was no phytotoxicity observed on the treated crop plants.

b. Aqueous dilutions of the dispersion according to Example 2(b) were applied as sprays at rates decreasing from 8 to 2.0 pounds of active substance per acre to cultures of beans ("Wade" variety), peas ("purple Hull 49" variety), and soybeans ("Clemson" variety) in the following manner:
1. pre-plant soil incorporation: (Harowed into the soil two days before the crop lants were sown).
2. pre-emergent application: (spraying of the field 1 day after the sowing of the corps).

Evaluation in both cases: 4 weeks after treatment.

Results:
At the time of the evaluation an untreated control field was heavily infested with junglerice (Panicum) as the only weed present. In the case of the test fields treated according to the methods (1) and (2) set forth above, it was observed that at the rate of 2.0 pounds per acre of active substance each of the three grop cultures was completely freed from the junglerice; beans and the peas tolerated 8.0 pounds, and the soybeans tolerated 14.0 pounds per acre of active substance without being damaged.

c. In a further pre-emergent test there was achieved a full effect against seedling of Johnson grass, sedge, and whiteclover growing in a culture of soybeans; the application rate of the active principle of the dispersion according to Example 2(b) was 2.0 pounds per acre; no damage to the soybeans could be observed.

d. A field was sown with dwarf beans and treated 1 day later (field A) or 9 days later (field B) with the spray liquor described in Example (2a) at the rates of 0.75 and 1.5 pounds per acre, respectively.

At the time of the A-treatment, neither weeds nor beans had germinated. At the time of the B-treatment the weeds were in cotolyden - stage. The beans had just emerged from the soil, their cotolydens had not unfolded. Four weeks after the treatment, the results were evaluated, and are shown in the Table below.

| Weeds | Time of treatment | | | | Control field |
|---|---|---|---|---|---|
| | A 0.75 lbs/ acre | A 1.5 lbs/ acre | B 0.75 lb/ acre | B 1.5 lbs/ acre | |
| Polygonum avic. (Knotweed) | 8 | 7 | 10 | 10 | 1 |

| | | | | | |
|---|---|---|---|---|---|
| Sonchus asper (Spring sowthisthle) | 10 | 10 | 10 | 10 | 1 |
| Chenopod. alb. (Lampsquater) | 10 | 10 | 10 | 10 | 1 |
| Stellaria media (chickweed) | 10 | 10 | 10 | 10 | 1 |
| Capsella b.past. (Shepherd's purse) | 10 | 10 | 10 | 10 | 1 |
| Sinapis arvens. (Wild mustard) | 8 | 10 | 10 | 10 | 1 |
| Veronica persic. (Buxbaum's speed well) | 10 | 10 | 10 | 10 | 1 |
| Polygonum convulvulus (birdweed) | 2 | 7 | 10 | 10 | 1 |

Ratings:
10 means full effect plant absolutely dead
0 means plant quite normal.
The beans had suffered no harm whatever from this treatment.

EXAMPLE 7 a. An aqueous dilution of the dispersion according to Example 2(b) was applied as a spray to a field sown with cotton at a rate of 0.5 pounds of active substance per acre, 2 days after the sowing of cotton plants.

At the weed evaluation, 4 weeks after the treatment, it was observed that the following weeds which had been predominant in the treated field, were completely killed: Lovegrass, Crabgrass and Pigweed. There was no phytotoxicity observed on the treated cotton plants.

b. Aqueous dilutions of the dispersion according to Example 2(b) were applied as sprays at rates decreasing from 4 to 2 pounds of active substance per acre to cultures of cotton plants in the following manner:
  1. pre-plant soil incorporation (Harrowed into the soil two days before the cotton was sown).
  2. pre-emergent application (spraying of the field 1 day after the sowing of the cotton).

Evaluation in both cases:
4 weeks after the treatment.
Results:

At the time of the evaluation an untreated control field was heavily infested with junglerice (Panicum) as the only weed present. In the case of the test fields treated according to the methods (1) and (2) set forth above, it was observed that at rates of 2.0 pounds per acre of active substance the cotton cultures were completely freed from the junglerice and that the cotton tolerated 4.0 pounds per acre of active substance without being damaged.

c. In a special tolerance test wherein an aqueous dilution of the dispersion according to Example 2(b) was employed, it was observed that under the conditions set forth above under b. the cotton plants tolerated up to 8.0 pounds of active substance without being damaged.

EXAMPLE 8 a. An aqueous dilution of the dispersion according to Example 2(b) was applied as a spray to a field sown with peanuts at a rate of 0.5 pounds of active substance per acre, 2 days after the sowing of peanuts.

At the weed evaluation, 4 weeks after the treatment, it was observed that the following weeds which had been predominant in the treated field, were completely killed: Lovegrass, Crabgrass and Pigweed. There was field, phytotoxicity observed on the treated peanut culture.

b. Aqueous dilutions of the dispersion according to Example 2(b) were applied as sprays at rates decreasing from 8 to 2 pounds of active substance per acre to cultures of peanuts in the following manner:
  1. pre-plant soil incorporation (Harrowed into the soil two days before the peanuts were sown).
  2. pre-emergent application (Spraying of the field 1 day after the sowing of the peanuts).

Evaluation in both cases:
4 weeks after the treatment.
Results:

At the time of the evaluation an untreated control field was heavily infested with junglerice (Panicum) as the only weed present. In the case of the test fields treating according to the methods (1) and (2) set forth above, it was observed that at rates of 2.0 pounds per acre of active substance the peanut cultures were completely freed from the junglerice and that the peanuts tolerated 8.0 pounds per acre of active substance without being damaged.

c. In a further pre-soil application test wherein an aqueous dilution of the dispersion according to Example 2(b) was applied at a rate of 1.0 pound of active substance per acre, the following previously predominant weeds were completely killed: dock, whiteclover and pepperweed. The peanuts tolerated 8.0 pounds of active substance without being damaged.

EXAMPLE 9 a. Aqueous dilutions of the dispersion according to Example 2(b) were applied as sprays at rates decreasing from 4 to 1 pound of active substance per acre by pre-plant soil incorporation (Harrowed into the soil two days before the tomatoes were planted).

At the evaluation 4 weeks after the treatment of the soil it was observed that the following weeds present in the cultures were killed as a result of active substance per acre: Dock, whiteclover and pepperweed. The tomatoes tolerated up to 8.0 pounds of active substance per acre, without being damaged.

b. In a further test aqueous dilutions of the dispersion according to Example 2(b) were applied as sprays to tomato cultures 1 day after the planting of the crops.

At the evaluation 4 weeks after the treatment, it was observed that at a rate of 0.5 pounds of active substance per acre the following weeds were killed: Dock and whiteclover, and that at a rate of 2.0 pounds of active substance per acre the following weeds were killed: sedge and seedling Johnson grass. No phytotoxic effects on the treated tomatoes were observed.

c. In a further test tomato plant were sprayed with an aqueous dispersion of the composition prepared in Example 2(b). The dispersion applied in an amount equivalent to 2 pounds per acre. Two days after spraying the plants were infested with a spore suspension of *Phytophthora infestans*. After infestion the plants were held for 2 days in an incubation chamber at 95–100% relative humidity and 22°–25° C. The following results were obtained 6–8 days after infection. The results are compared with tomato plats subjected to the same treatment except for the treatment with the compound of this invention. The untreated plant were 100% infested with the fungi while the treated plant were free of infestation.

d. The procedure described in Example 9(c) was repeated with the exception that the soil was infested with dock, whiteclover and pepperweed. After 4 weeks the culture was examined and found to be free of both fungi and weed while the tomato plants did not appear to be affected.

EXAMPLE 10

Aqueous dilutions of the dispersion according to Example 2(b) were applied as sprays at rates of 0.75 and 1.5 pounds of active substance per acre to cultures of carrots, 2 weeks after the corps had been sown. At the evaluation 4 weeks after the treatment, it was observed that the following weeds which had been predominant in the treated test field, were practically completely killed: Lambsquater, Ragweed and Smartweed. No phytotoxic effects on the treated carrots were observed.

In a tolerance test it was observed that the carrots tolerated 6 pounds of active substance per acre in case of preemergent application and in the case of postemergent application.

EXAMPLE 11

The compound of formula (I) was very active against harmful nematodes, e.g. panagrellus redivivus, when applied, for instance, at a rate of 0.01% by weight.

EXAMPLE 12

A 10 percent aqueous solution was mixed with/percent by weight propylene glycol solution of the compound prepared in Example I.

Three solutions were prepared one having 600 PPM, a second having 500 PPm and a third having 250 PPM of the active compound prepared in Example one.

The resulting solution were inoculated with 1 drop of a spore suspension of *Rhizopus Nigricans* and incubated for 4 days at 24° C whereafter the fungicidal effect was checked by determining the growth of the mycelium and comparing it with a control containing no active compound but the same amount of nutrient medium as the test sample

| Concentration active compound | Result |
|---|---|
| 600 PPM | 100% fungicidal activity |
| 500 PPM | as above |
| 250 PPM | as above |
| CONTROL | no apparent fungicidal activity |

EXAMPLE 13

Example 3(a) was repeated with the exception that the filed was also infested with a spore dispersion of *Phytophora infestans*. After 2 months 97% of the plants in the treated field were free of fungi. In the untreated filed almost all the plants were seriously infested.

We claim:

1. A method for the control of undesirable fungi which method comprises applying thereto an effective amount of the compound of the formula:

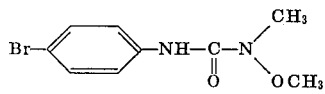

* * * * *